US008485121B2

(12) United States Patent
Durst et al.

(10) Patent No.: US 8,485,121 B2
(45) Date of Patent: Jul. 16, 2013

(54) COATING TOOL FOR APPLYING A FLUID FILM ONTO A SUBSTRATE

(75) Inventors: Franz Durst, Langensendelbach (DE); Buelent Uensal, Yenimahalle (TK)

(73) Assignee: FMP Technology GmbH Fluid Measurements & Projects, Erlangen (DE)

(*) Notice: Subject to any disclaimer, the term of this patent is extended or adjusted under 35 U.S.C. 154(b) by 162 days.

(21) Appl. No.: 12/737,816

(22) PCT Filed: Aug. 14, 2009

(86) PCT No.: PCT/EP2009/060575
§ 371 (c)(1),
(2), (4) Date: May 10, 2011

(87) PCT Pub. No.: WO2010/020594
PCT Pub. Date: Feb. 25, 2010

(65) Prior Publication Data
US 2011/0271903 A1 Nov. 10, 2011

(30) Foreign Application Priority Data
Aug. 21, 2008 (DE) .......................... 10 2008 041 423

(51) Int. Cl.
*B05C 5/00* (2006.01)
*B05B 1/14* (2006.01)
*B29C 47/00* (2006.01)
*B29C 47/12* (2006.01)

(52) U.S. Cl.
USPC ........ 118/300; 118/411; 118/412; 239/553.3; 239/590.5; 239/601; 425/461

(58) Field of Classification Search
USPC ....... 118/300, 313–315, 410–412; 239/553.5, 239/548–556, 590–602; 425/461, 133.5, 425/462–466; 427/427.3
See application file for complete search history.

(56) References Cited

U.S. PATENT DOCUMENTS
5,234,649 A * 8/1993 Cloeren ................... 264/173.16
7,270,711 B2 * 9/2007 DeMent et al. ............... 118/300

FOREIGN PATENT DOCUMENTS
DE 40 10 262 A1 3/1990
GB 2 410 909 A 8/2005
WO WO 2008/058911 A1 5/2008

OTHER PUBLICATIONS
F. Durst et al., "Stabilität von Filmen in der Fliesser-Filmbeschichtung", Coating Dec. 1989, Jan. 1990, Feb. 1990.

* cited by examiner

*Primary Examiner* — Yewebdar Tadesse
(74) *Attorney, Agent, or Firm* — Manabu Kanesaka

(57) ABSTRACT

The invention relates to a coating tool for applying a fluid film onto a substrate, wherein disposed upstream of a slot nozzle (1) for producing a fluid film, said nozzle extending substantially across the entirety of a first width (B1) of the coating tool in unbroken fashion, is a distribution space (7) for distributing the fluid over a second width (B2) of the slot nozzle (1), wherein at least one channel (6) for feeding fluid is provided upstream of the distribution space (7), said channel having a third width (B3), and wherein the third width (B3) is smaller than the second width (B2). To avoid an uneven throughput of material across the width of the slot, it is proposed according to the invention that a plurality of feed channels (9) be disposed in the distribution space (7), said channels having a cross sectional area that increases in the direction of flow (S).

11 Claims, 8 Drawing Sheets

Figure 1A:
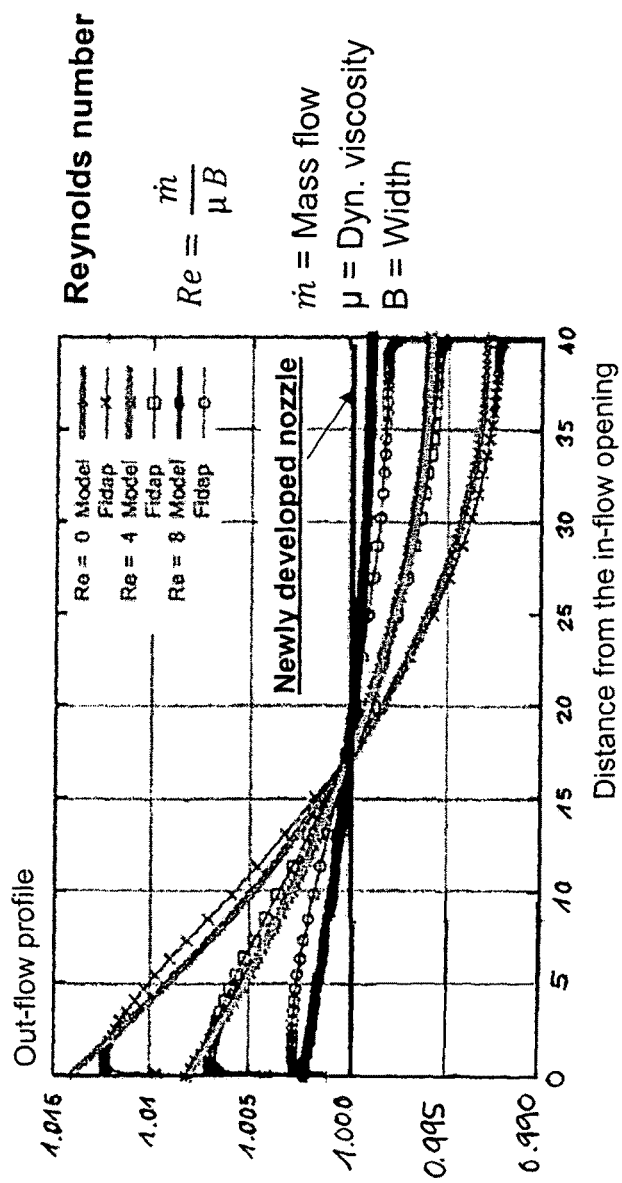

Viscosity for non-Newtonain fluid:

$$\eta = \cfrac{\eta_0}{\left[1+\left(\cfrac{\eta_0 \gamma}{\tau_x}\right)^2\right]^{1-n/2}}$$

COATING TOOL FOR APPLYING A FLUID FILM ONTO A SUBSTRATE

RELATED APPLICATIONS

The present application is National Phase of International Application No. PCT/EP2009/060575 filed Aug. 14, 2009 and claims priority from German Application No. 10 2008 041 423.9 filed Aug. 21, 2008 the disclosure of which is hereby incorporated by reference herein in its entirety.

The invention relates to a coating tool for applying a fluid film onto a substrate.

The invention relates in general to the area of coating plane substrates, for example paper or similar, with a fluid. To this extent, reference is made to Durst, F. et al. "Stabilität von Filmen in der Fließer-Filmbeschichtung", Coating, December 1989, January 1990, February 1990. From this, in particular concerning the so-called curtain coating, slot flow tools are known for which a mouthpiece has a slot nozzle for generating a thin film of the fluids used for the coating. The slot nozzle can have a width of up to 7 m. It is usually made of two slot nozzle elements which are mounted in an arrangement opposite each other. A slot width of the slot nozzle is usually in the range of from 50 to 400 µm.

The coating tools known from prior art, for example from U.S. Pat. No. 5,234,649, are designed specifically for the fluid being processed therewith. The mass throughput or a mass flow rate of the fluid across the width of the slot nozzle already changes when there is a slight change in the coating parameters, for example in the viscosity of the fluid, in the surrounding conditions or similar. In other words, the mass throughput of the fluid is no longer constant across the width of the slot nozzle. Due to this, a substrate to be coated which is moved at a constant speed relative to the slot nozzle has an increased coating thickness everywhere where the mass throughput through the slot nozzle is increased. Such variations in the coating thickness are not desired. They cause various problems during subsequent processing steps of the coated substrate.

The object of the invention is to eliminate the disadvantages of the prior art. In particular, a coating tool is to be specified which has a uniform mass throughput across the entire width of the slot nozzle even when there is a change in the surrounding conditions. According to a further goal of the invention, the coating tool should be able to be used universally so that even different fluids, in particular fluids of different viscosities, can be applied onto a substrate with a constant mass throughput across the entire width of the slot nozzle.

This object is solved by the first aspect. Useful embodiments of the invention result from the features in the second to twelfth aspect.

According to the provisions of the invention, it is suggested to provide in the distribution space a plurality of distribution channels having an increasing cross sectional area in the direction of flow.—This succeeds in a surprisingly simple way in largely holding the pressure of the fluid being present at the slot nozzle or at the outlet opening constant across the entire width, even when there is a change in the surrounding conditions. The suggested coating tool can be used to ensure at all times a constant mass throughput across the entire width of the slot nozzle even when different fluids are used, particularly fluids with different viscosities.

The suggested coating tool is thus extremely universal. This makes it unnecessary to make coating tools which are specifically adjusted to the processing of each particular fluid.

The cross sectional area of the distribution channels can increase 1.5 to 30 times, preferably 5 to 20 times, particularly preferably 8 to 15 times. The respective enlargement factor of the cross sectional area can be varied across the second width. This can be used to compensate via the third width for any differences in pressure caused by the construction.

According to an embodiment of the invention, the distribution channels extend from the channel up to the vicinity of the slot nozzle. They can extend up to the slot nozzle or also end up to 30 mm before the slot nozzle.

According to a particularly simple embodiment, it is provided that the distribution channels are limited by walls essentially running perpendicularly to the slot nozzle. Thereby, the walls can have a height in the range of 3 to 50 mm. The walls in this embodiment run in a fan-like manner from the channel in the direction to the slot nozzle. The walls advantageously extend from a front slot nozzle plate limiting the distribution space to a back slot nozzle plate arranged opposite. The walls are advantageously arranged symmetrically regarding a plane of symmetry which extends perpendicularly to the slot nozzle plates and runs through the middle of the channel.

A cross sectional area of the distribution channels which area is increasing in the direction of flow can be easily implemented by having a distance created between adjacent walls which distance increases from the channel to the slot nozzle.

According to a further embodiment, it is provided that at least several of the walls have at least one breakthrough. Thereby, the breakthroughs can be provided in the respective walls in the area of their channel-sided first ends and/or in the area of their slot nozzle-sided second ends.—The provision of the suggested breakthroughs contributes further to the uniformity of the fluid pressure being present at the slot nozzle across its entire width.

According to a further embodiment, each of the distribution channels is connected with a thereto corresponding feed channel provided in the channel. To the extent that the channel has a constant cross sectional area in the direction of flow, the feed channels also have a constant cross sectional area. By providing the feed channels, a fluid stream is already subdivided within the channel into partial streams each of which has essentially the same mass throughput. Due to this, also the mass throughput through the distribution channels and thus across the entire slot width is particularly uniform.

In an embodiment which is particularly simple to construct, the walls for limiting the feed channels extend up into the channel. In other words, in this case, the walls running from the channel up into the distribution space limit both the feed and also the distribution channels.

According to a further advantageous embodiment, it is provided that the distribution and/or feed channels are part of at least one mounting element which can be inserted into the distribution space. Thereby, the mounting element can be arranged in such a manner that the feed channels provided thereon extend from precisely one channel to the slot nozzle. Thus a plurality of such mounting elements can be used next to each other in a coating tool having a plurality of channels.

According to a further particularly inexpensive embodiment, it is provided that the mounting element is made of plastic. With this, a coating tool can be equipped or retrofitted in an extremely simple and inexpensive manner to achieve the advantages provided by the invention. However, the walls limiting the feed and/or distribution channels can also be made of stainless steel, Invar® steel or aluminum. In particular it is also possible to make the walls creating the feed and/or distribution channels in one piece with the second slot nozzle plate. Aside from this, it is also possible to make the inner sides of the walls facing the feed and/or distribution channels out of a ceramic, for example, tungsten carbide or silicon carbide. Coating the walls with a plastic, for example tetrafluorethylene, is also considered advantageous.

The invention can also be applied to conventional 2-chamber coating tools for which a buffer space opening towards the slot nozzle is provided between the slot nozzle and the distribution space, which buffer space is connected with the distribution space by a slot-like passageway extending essentially across the second width. The provision of a buffer space downstream from the distribution space provided with the distribution channels provided by the invention contributes further to a particularly homogeneous pressure distribution of the fluid waiting at the slot nozzle. Corrected. Thank you.

Figure 2:
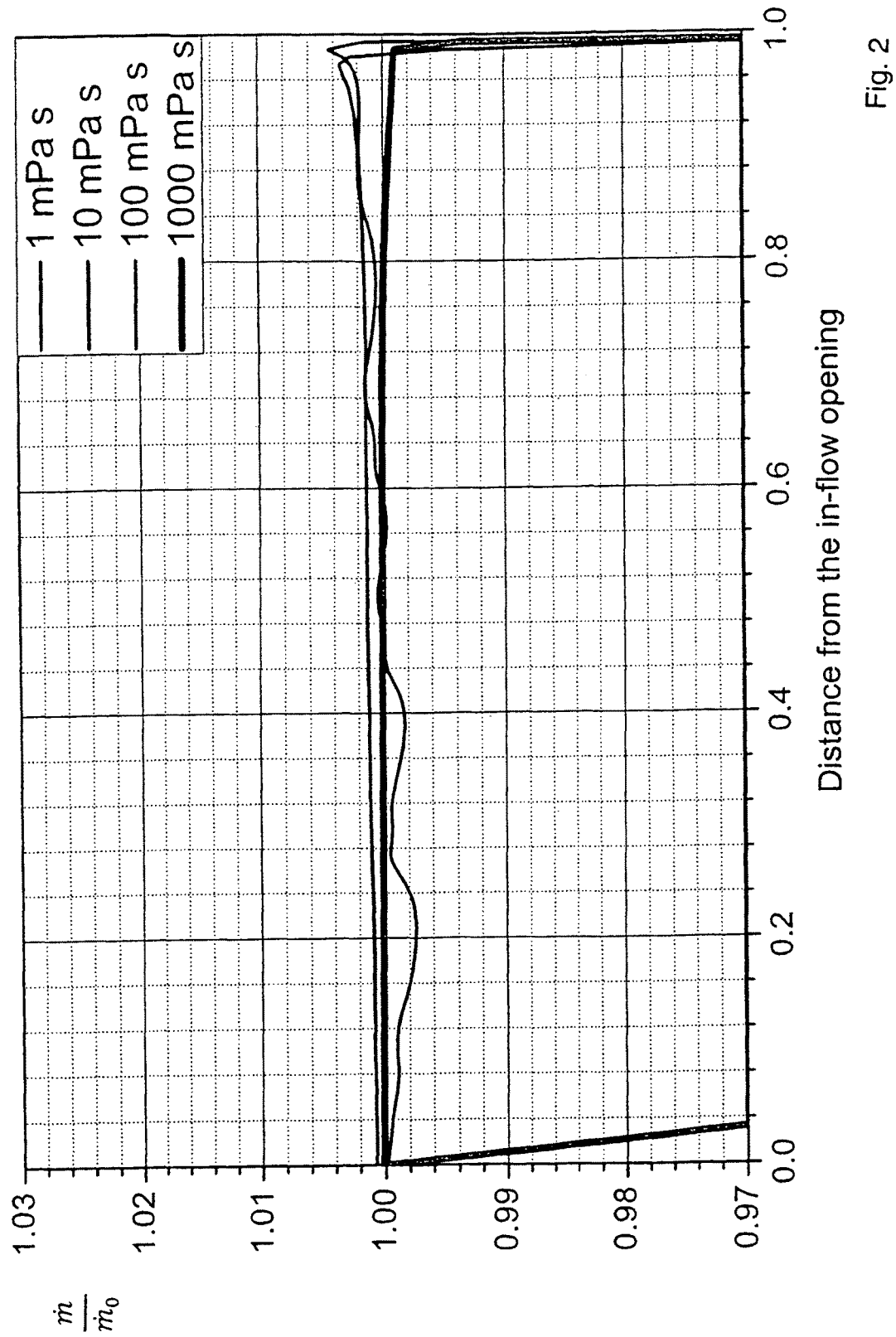
Figure 3:
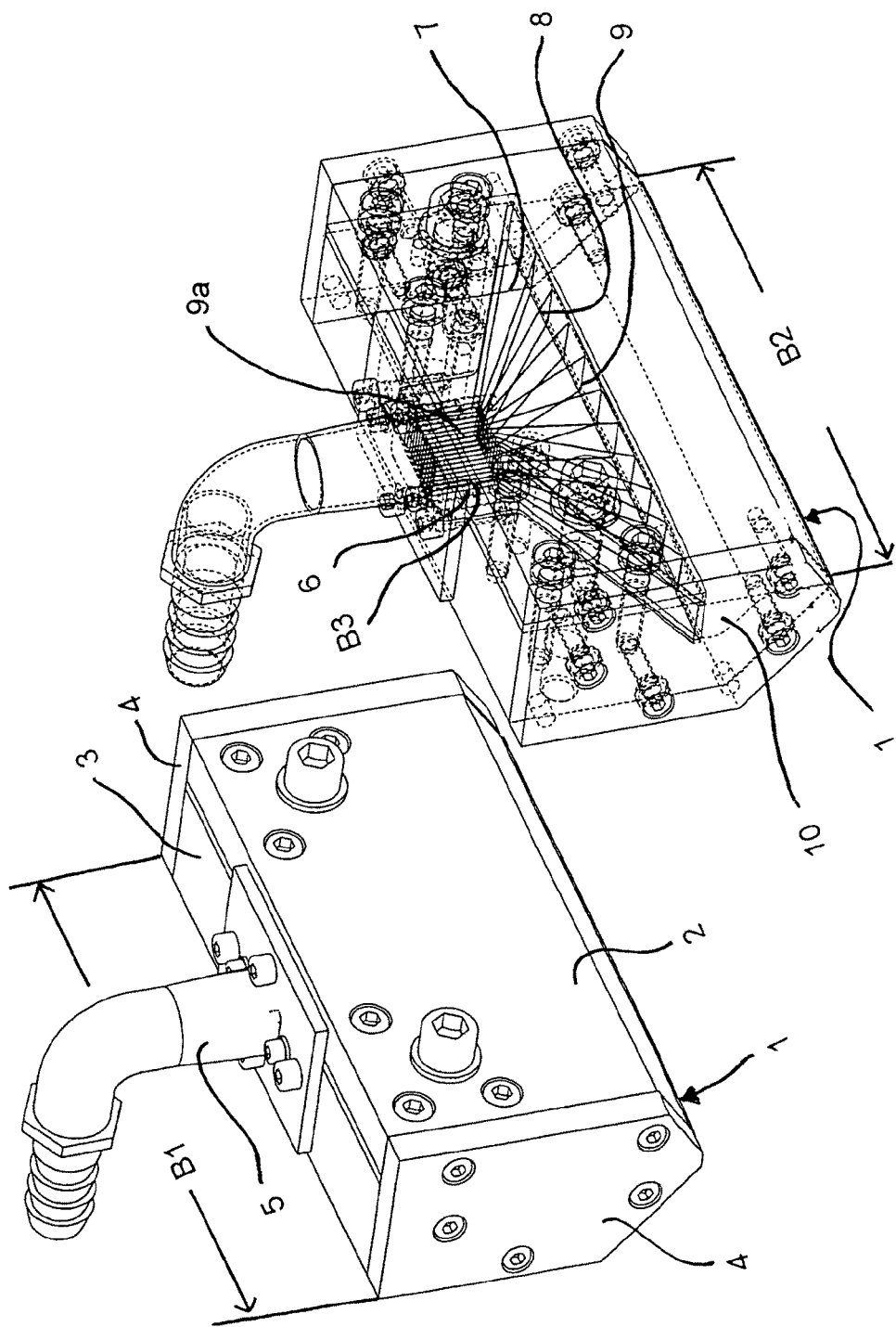
Figure 4:
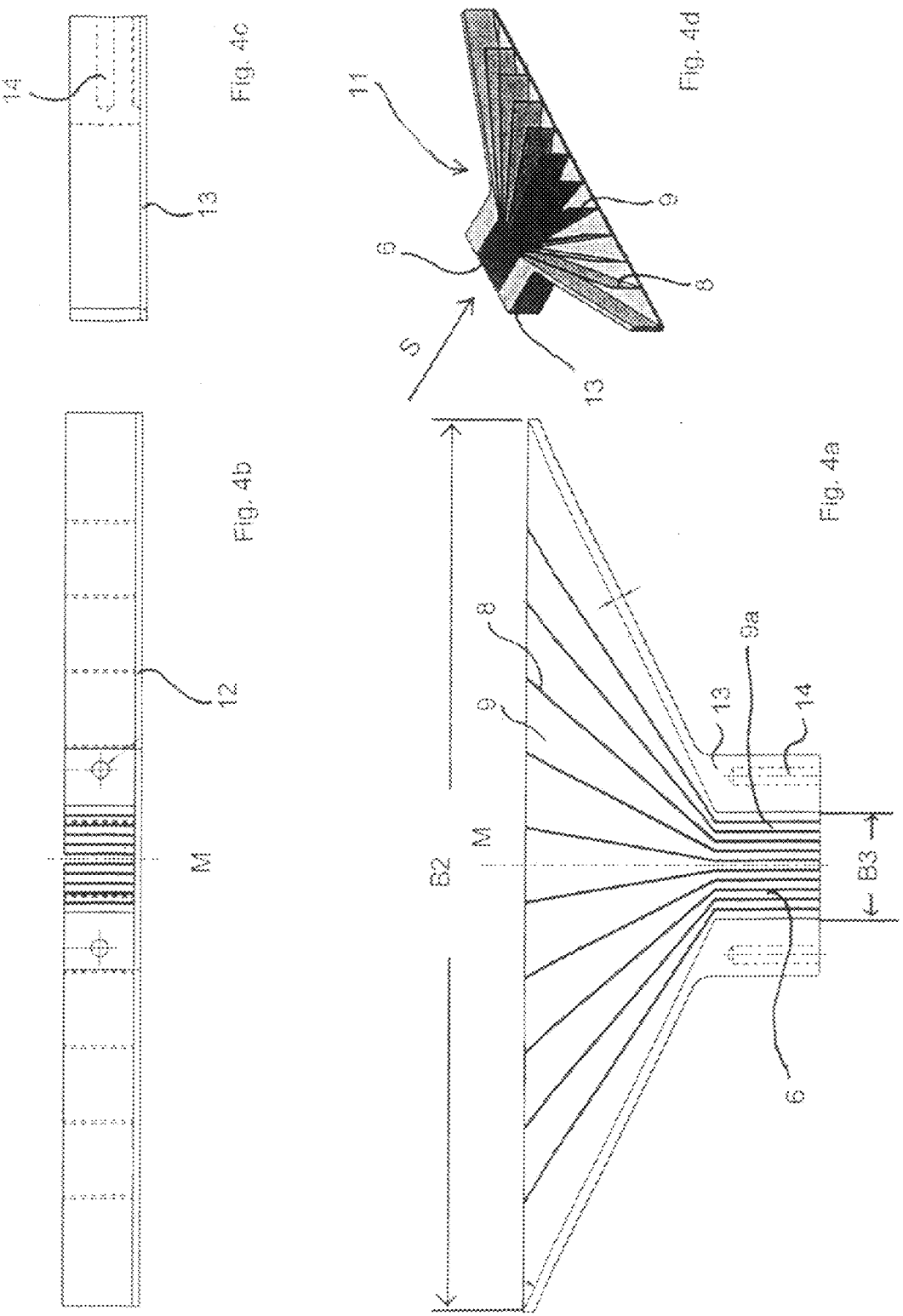
Figure 5:
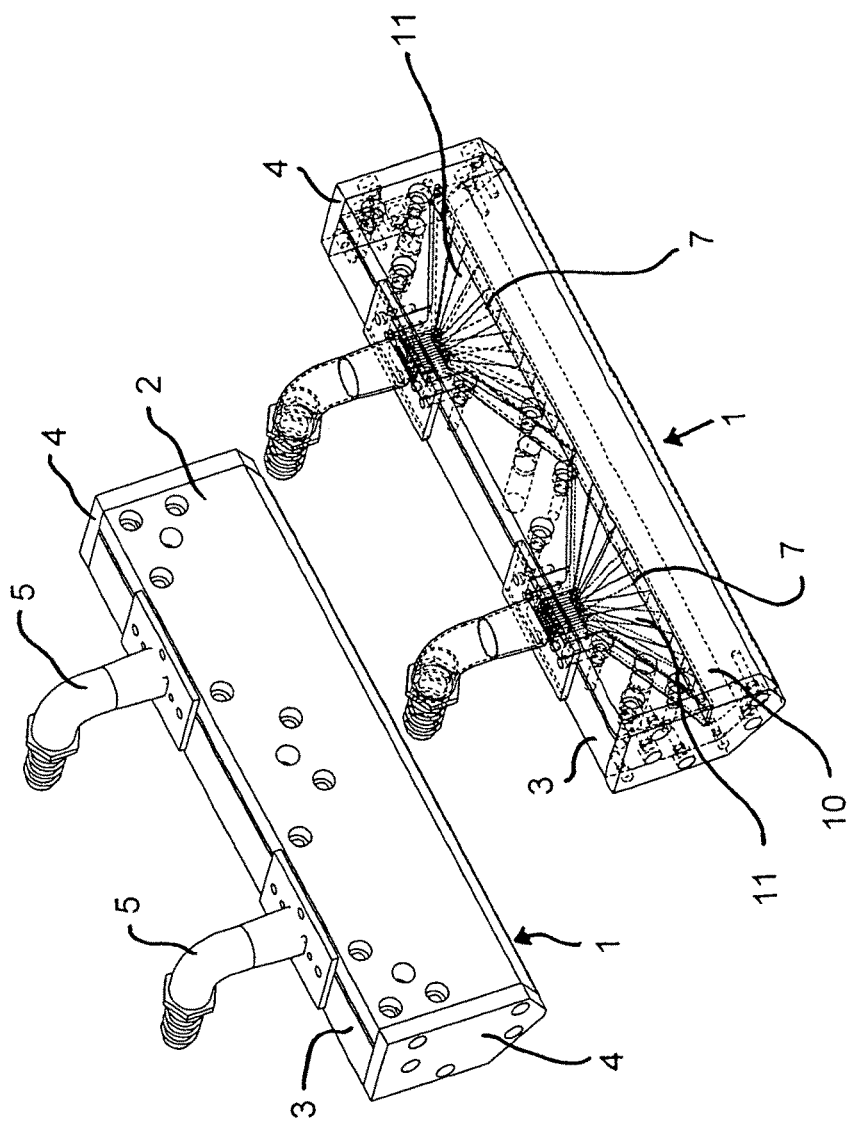
Figure 6:
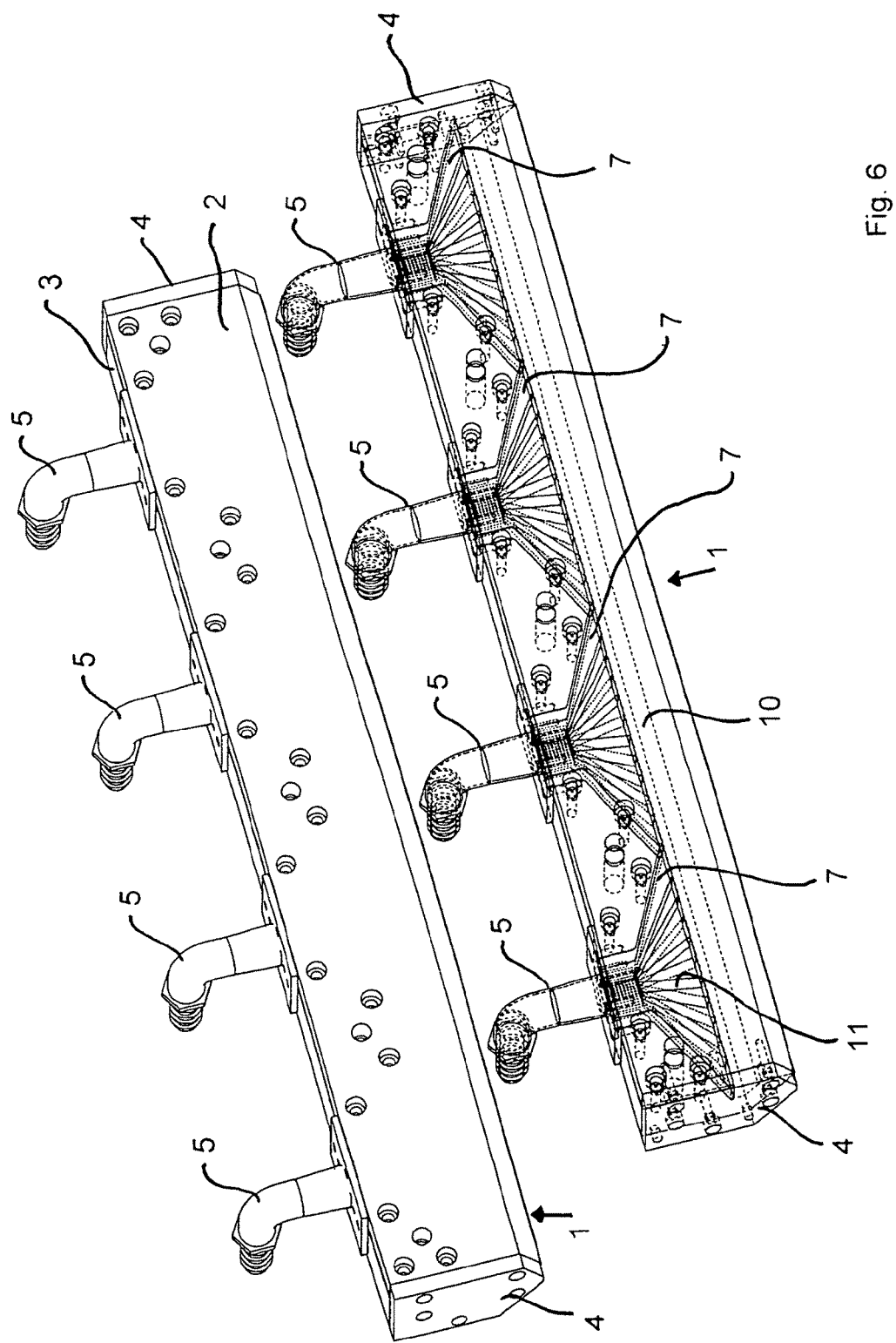
Figure 7:
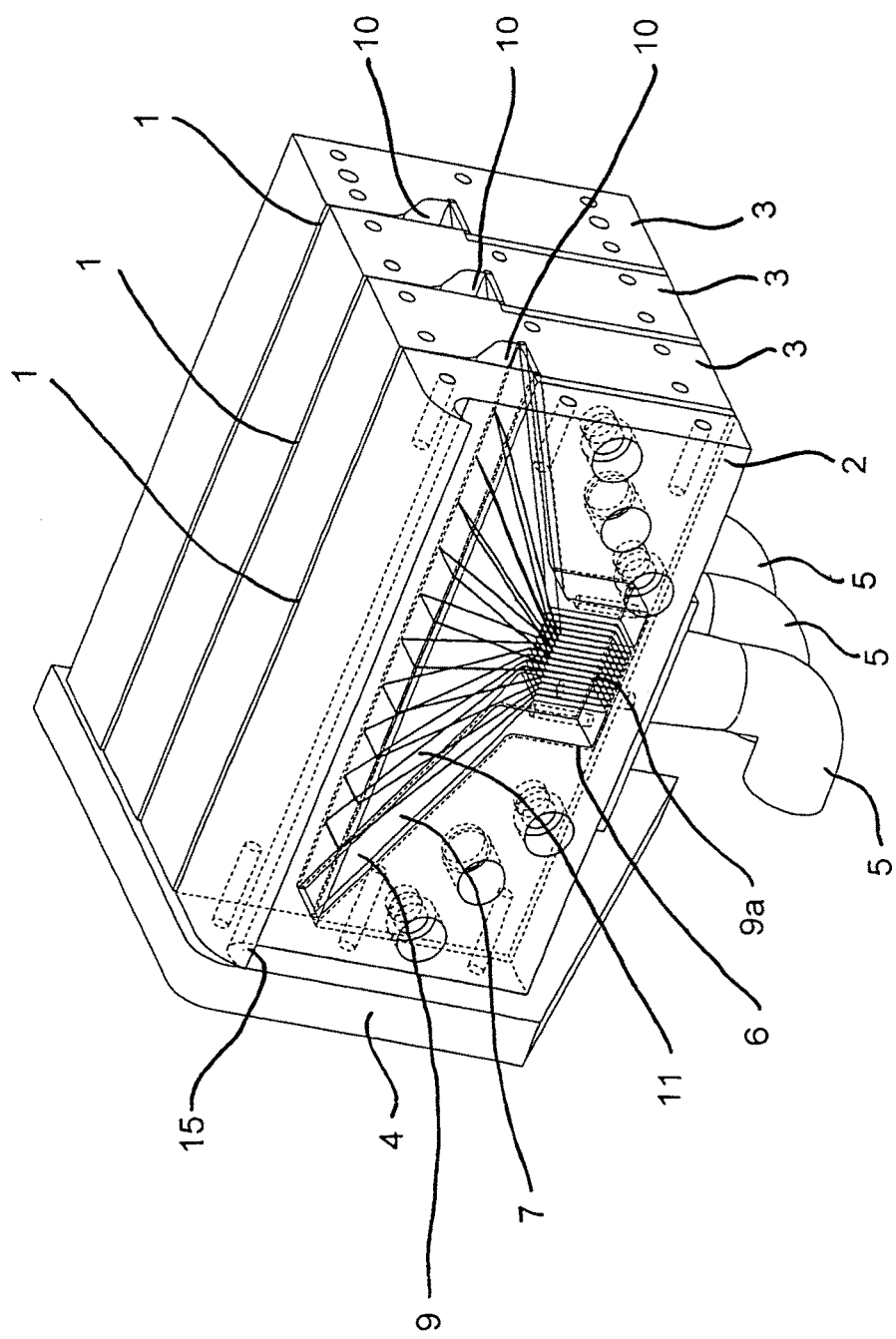

Examples will now be used to describe the invention in more detail based on the drawings. The figures show:

FIG. 1a, b the change in the mass flow rate over the distance from the inflow opening for fluids of different viscosities for a conventional coating tool in comparison to a coating tool provided by the invention, FIG. 2 the change in the mass flow rate over the distance from the inflow opening for fluids of different viscosities for a coating tool provided by the invention, FIG. 3 perspective views of a first coating tool provided by the invention, FIG. 4a-d different views of a mounting element provided by the invention, FIG. 5 perspective views of a second coating tool provided by the invention, FIG. 6 perspective views of a third coating tool provided by the invention, and FIG. 7 perspective view of a fourth coating tool provided by the invention.

Figure 1B:
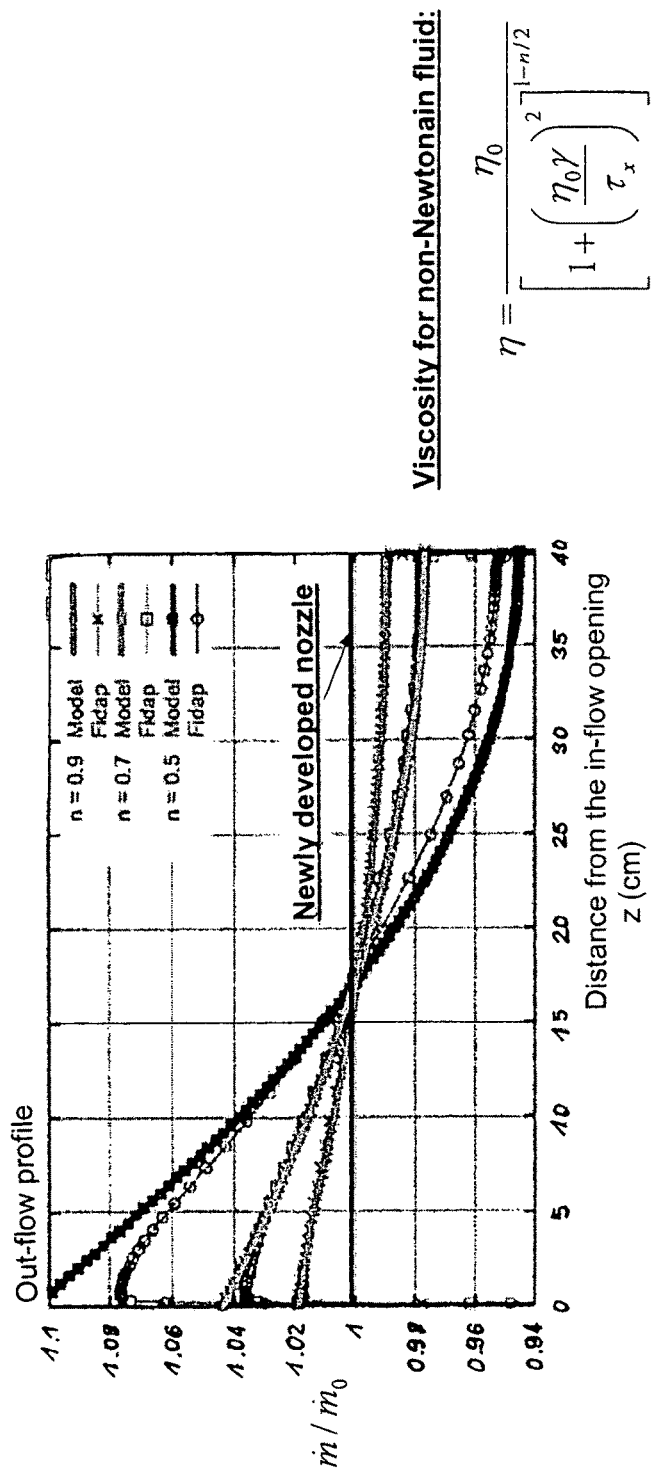

FIGS. 1a and 1b each show the change in the mass throughput or mass flow rate $\dot{m}/\dot{m}_0$ over the distance from the inflow opening, in other words over the distance of a center plane M extending through the channel. FIG. 1a shows the behavior of Newtonian fluids. FIG. 1b shows the behavior of non-Newtonian fluids. As shown in FIGS. 1a and 1b, when conventional coating tools are used, the mass flow rate decreases continuously with increasing distance from the center plane M, in other words towards the edge of the slot nozzle. In case of the "newly developed nozzle" or the coating tool provided by the invention, in contrast the mass flow rate remains constant across the entire width of the slot nozzle both when Newcontain and non-Newtonian fluids are used.

FIG. 2 shows the change in the mass flow rate $\dot{m}/\dot{m}_0$ over the normalized distance from the inflow opening for a coating tool provided by the invention. It can be seen that the mass flow rate has approximately the same value across the entire slot width. It is particularly notable that the mass flow rate for the coating tool provided by the invention is virtually independent from the viscosity of the fluid.

FIG. 3 shows perspective views of a first coating tool provided by the invention. The coating tool has a slot nozzle between a first slot nozzle plate 2 and a second slot nozzle plate 3 arranged essentially parallel to the first slot nozzle plate 2. Reference numeral 4 refers to side plates attached on the side to the slot nozzle plates 2, 3. A feed tube 5 to feed a fluid leads to a channel 6 created in the second slot nozzle plate 3. The channel 6 in turn leads to a distribution space 7 provided downstream therefrom in the second slot nozzle plate 3, which distribution space 7 expands conically in the direction of flow.

In the channel 6 as well as in the distribution space 7, walls 8 extend perpendicularly to the slot nozzle plates 2, 3. The walls 8 extending between the slot nozzle plates 2, 3 limit distribution channels 9. In the distribution space 7, the distribution channels 9 have an expanding cross section in the direction of flow. Downstream from the distribution space 7 is a slot nozzle space 10 which tapers in the direction of flow towards the slot nozzle 1.

A first width of the coating tool between the outer surfaces of the side plates 4 is designated as B1. A second width of the slot nozzle 1 is designated as B2. And a third width B3 of the channel 6 is designated as B3. As is shown in FIG. 3, the third width B3 is smaller than the second width B2. The second width B2 is smaller than the first width B1. The second width B2 corresponds essentially to the first width B1. In other words, the first width B1 differs essentially only from the second width B2 by the thickness of the side plates 4.

FIG. 4a-d show a top view, a first side view, a second side view as well as a perspective view of a mounting element 11 which can be inserted into the distribution space 7 of a coating tool which distribution space 7 is created in the second slot nozzle plate 3. As is particularly shown in FIGS. 4a and 4d, the walls 8 first run parallel in the area of the channel 6 and create here a plurality of feed channels 9a. A direction of flow S of a fluid flowing through the distribution space 7 and/or the mounting element 11 is designated as reference sign S. Downstream from channel 6, the walls 8 turn, namely in a direction away from a symmetry or center plane M running through channel 6. The mounting element 11 has a base plate 12 from which the walls 8 as well as lateral limiting elements 13 extend. In the lateral limiting elements 13, threaded holes 14 can be provided to secure the mounting element 11. The mounting element 11 is advantageously made of plastic, preferably of injection molded plastic:

With the mounting element 11 shown in FIG. 4a-d, precisely one channel 6 is provided. However, it is also conceivable that mounting elements 11 are provided which are combined from a plurality of the mounting elements 11 shown. In other words, for which a plurality of channels 6 are provided.

FIGS. 5 and 6 show a second as well as a third coating tool. With the second coating tool, two distribution spaces 7 having mounting elements 11 contained therein are provided for the enlargement of the second width B2. With the third coating tool shown in FIG. 6, four distribution spaces 7 in which one mounting element 11 each is contained are provided for the further enlargement of the second width B2.

FIG. 7 shows a perspective view of a fourth coating tool. The fourth coating tool has three slot nozzles 1 arranged one in back of the other. Second slot nozzle plates 3 are arranged like ascending steps. In each of the second slot nozzle plates 3, a distribution space 7 is created which contains in turn one mounting element 11. Reference numeral 15 designates a tab via which a layered fluid film drains off like a "curtain" and is applied onto a substrate (not shown here), which layered fluid film 15 leaves the slot nozzles 1 and is formed by a plurality of fluid films located one on top of the other.

The function of the coating tool provided by the invention is as follows:

The fluid to be applied onto a substrate (not shown here) is feeded by the feed tube 5. The feeded fluid is divided in the channel 6 by the feed channels 9a into partial fluid streams. A partial fluid stream situated in each of the feed 9a as well as distribution channels 9 is essentially present with the same pressure at the slot nozzle 1 or at the slot nozzle space 10 arranged upstream before the slot nozzle 1. Thus the pressure distribution on the slot nozzle 1, if applicable in the slot nozzle space 10, is especially uniform across the entire second width B2. Due to this, the mass throughput or the mass flow rate is also essentially constant across the entire second width B2.

With the coating tool shown in these explanatory examples, the walls 8 extend until the end of the distribution space 7. However, it is also conceivable that the walls 8 extend up into the slot nozzle space 10. Moreover, it is possible that the walls 8 have breakthroughs in the area of their channel-sided ends and/or in the area of their slot nozzle-sided additional ends. Any fluctuations in pressure which still occur can be equalized with this.

In these explanatory examples, the feed channels 9*a* as well as the distribution channels 9 have a rectangular cross section. Of course, it is also conceivable that the cross section of the feed channels 9*a* as well as of the distribution channels 9 has a different geometry.

An opening cross section of the distribution channels 9 can vary at the slot nozzle-sided end. For example, an opening cross section in the area of the center plane M can be smaller than an opening cross section of the distribution channels 9 on both edges of the distribution space 7.

This invention can be applied to different types of coating tools. For example, it can also be applied to 2-chamber coating tools on which a buffer space extending across the second width B2 is provided downstream from the slot nozzle space 10. Moreover, the invention can be applied to sliding film process coating tools, sliding film flower coating tools as well as slot nozzle flower coating tools and similar.

REFERENCE SIGNS

1 Slot nozzle
2 First slot nozzle plate
3 Second slot nozzle plate
4 Side plate
5 Feed tube
6 Channel
7 Distribution space
8 Wall
9 Distribution channel
9*a* Feed channel
10 Slot nozzle space
11 Mounting element
12 Base plate
13 Limiting element
14 Threaded hole
15 Tab
B1 First width
B2 Second width
B3 Third width
M Center plane S Direction of flow

The invention claimed is:

1. A coating tool for applying a fluid film onto a substrate, comprising:
a slot nozzle for producing the fluid film;
a distribution space for distributing fluid over a second width of the slot nozzle, provided upstream from the slot nozzle, which is uninterruptedly extending essentially across an entirety of a first width of the coating tool;
at least one channel for feeding the fluid, provided upstream from the distribution space, said at least one channel having a third width wherein the third width is smaller than the second width; and
a plurality of distribution channels provided in the distribution space, and having an increasing cross sectional area in a direction of flow,
wherein each of the distribution channels is connected with a thereto corresponding feed channel provided in the at least one channel.

2. The coating tool as defined in claim 1, wherein the plurality of distribution channels is limited by walls running essentially perpendicular to a slot nozzle plate of the slot nozzle.

3. The coating tool as defined in claim 1, wherein the plurality of distribution channels extends from the at least one channel up to a vicinity of the slot nozzle.

4. The coating tool as defined in claim 1, wherein a distance created between adjacent walls increases from the at least one channel towards the slot nozzle.

5. The coating tool as defined in claim 1, wherein at least several of walls have at least one breakthrough.

6. The coating tool as defined in claim 5, wherein the at least one breakthrough is provided in the respective walls in an area of channel-sided first ends thereof and/or in an area of slot nozzle-sided second ends thereof.

7. The coating tool as defined in claim 1, wherein walls for limiting the feed channels extend up into the at least one channel.

8. The coating tool as defined in claim 1, wherein the plurality of distribution channels and/or the feed channels are part of at least one mounting element which can be inserted into the distribution space.

9. The coating tool as defined in claim 8, wherein the mounting element is made of plastic.

10. The coating tool as defined in claim 1, further comprising a buffer space opening towards the slot nozzle provided between the slot nozzle and the distribution space.

11. The coating tool as defined in claim 10, wherein the buffer space is connected with the distribution space via a slot passageway extending essentially across the second width.

* * * * *